US012465840B2

(12) United States Patent
Bowden-Eyre et al.

(10) Patent No.: US 12,465,840 B2
(45) Date of Patent: Nov. 11, 2025

(54) EXERCISE APPARATUS

(71) Applicant: SWING FITNESS LIMITED, Cambridge (GB)

(72) Inventors: Thomas Bowden-Eyre, Cambridge (GB); William Thomas Edward Briggs, Cambridge (GB)

(73) Assignee: SWING FITNESS LIMITED, Cambridge (GB)

( * ) Notice: Subject to any disclaimer, the term of this patent is extended or adjusted under 35 U.S.C. 154(b) by 153 days.

(21) Appl. No.: 18/282,778

(22) PCT Filed: Mar. 15, 2022

(86) PCT No.: PCT/EP2022/056642
§ 371 (c)(1),
(2) Date: Sep. 18, 2023

(87) PCT Pub. No.: WO2022/194838
PCT Pub. Date: Sep. 22, 2022

(65) Prior Publication Data

US 2024/0165482 A1 May 23, 2024

(30) Foreign Application Priority Data

Mar. 19, 2021 (GB) ..................................... 2103826

(51) Int. Cl.
*A63B 71/00* (2006.01)
*A63B 21/078* (2006.01)
(Continued)

(52) U.S. Cl.
CPC ........ *A63B 71/0036* (2013.01); *A63B 21/078* (2013.01); *A63B 24/0062* (2013.01);
(Continued)

(58) Field of Classification Search
CPC ............ G07C 9/00309; G07C 9/00912; G08B 13/1472; G08B 21/182; A63B 21/078;
(Continued)

(56) References Cited

U.S. PATENT DOCUMENTS 6,454,683 B1 * 9/2002 Kaye .................. A63B 71/0036 482/904
10,960,256 B2 * 3/2021 Donnelly ........... A63B 21/4029
(Continued)

FOREIGN PATENT DOCUMENTS

CN 108525245 A 9/2018
EP 0 249 501 A2 12/1987
(Continued)

OTHER PUBLICATIONS

International Search Report and Written Opinion on PCT App. PCT/EP2022/056642 dated Nov. 7, 2022 (35 pages).

*Primary Examiner* — Megan Anderson
*Assistant Examiner* — Jonathan A Dicuia
(74) *Attorney, Agent, or Firm* — Foley & Lardner LLP

(57) ABSTRACT

An exercise apparatus comprises a support element (4) for physically supporting a user (6), a container (10) having a storage volume, and one or more items of exercise equipment (12) configured to be stored in the storage volume. The container includes an access opening (14) providing access to the storage volume, a closure element (16) and a releasable lock (18) for locking the closure element in the closed position. A control device (20) is configured to communicate with a personal mobile device (26) associated with a user and exchange control signals including an authorisation signal that authorises use of the exercise apparatus. The control device (20) is configured to receive a weight signal from a weight sensor associated with the storage volume and
(Continued)

detect from said weight signal the removal and replacement of items of exercise equipment in the storage volume.

25 Claims, 3 Drawing Sheets

(51) Int. Cl.

| | |
|---|---|
| ***A63B 24/00*** | (2006.01) |
| ***G07C 9/00*** | (2020.01) |
| ***G08B 13/14*** | (2006.01) |
| ***G08B 21/18*** | (2006.01) |

(52) U.S. Cl.
CPC ...... *A63B 24/0087* (2013.01); *G07C 9/00309* (2013.01); *G07C 9/00912* (2013.01); *G08B 13/1472* (2013.01); *G08B 21/182* (2013.01); *A63B 2220/52* (2013.01); *A63B 2225/09* (2013.01); *A63B 2225/15* (2013.01); *A63B 2225/50* (2013.01)

(58) Field of Classification Search
CPC . A63B 21/4029; A63B 71/02; A63B 71/0036; A63B 24/0062; A63B 24/0087; A63B 2220/52; A63B 2225/15; A63B 2024/0093
See application file for complete search history.

(56) References Cited

U.S. PATENT DOCUMENTS

| | | | | |
|---|---|---|---|---|
| 2018/0070753 | A1* | 3/2018 | Eveloff ................. | H04W 4/025 |
| 2019/0172298 | A1* | 6/2019 | Just ..................... | G07F 17/0042 |
| 2020/0101346 | A1* | 4/2020 | Chen .................. | A63B 21/4029 |

FOREIGN PATENT DOCUMENTS

| | | | |
|---|---|---|---|
| WO | WO-2014/054938 | A2 | 4/2014 |
| WO | WO-2018/081267 | A1 | 5/2018 |

* cited by examiner

EXERCISE APPARATUS

CROSS-REFERENCE TO RELATED APPLICATIONS

This application is a U.S. National Phase Application under 35 U.S.C. § 371 of International Application No. PCT/EP2022/056642, filed on Mar. 15, 2022, which claims the benefit of and priority to GB Appl. No. 2103826.0 filed Mar. 19, 2021, each of which is incorporated herein by reference in their entirety for any and all purposes.

The present invention relates to an exercise apparatus and in particular, but not exclusively, to an exercise apparatus for outdoor use in public areas, for example parks and recreation grounds.

BACKGROUND

Many people enjoy exercising outdoors, for example by taking part in aerobic exercise such as running, walking or cycling. In addition, many people enjoy performing strength-building exercises using strength-building equipment, for example weights and exercise machines. However, these exercises usually take place indoors within a gym, where the equipment can be safely housed. There is a demand for facilities enabling people to combine strength-building exercises while exercising outdoors, either as a stand-alone exercise or combined with aerobic exercise.

It is known to provide outdoor exercise equipment for use by members of the public. However, the range of equipment that is available is limited, for example by the need to prevent theft or damage to the equipment, or mis-use of the equipment. Therefore, outdoor exercise equipment tends to be of a kind that is permanently attached to the ground. Portable items of exercise equipment, for example free weights, are not generally provided for use in public areas.

There is a need for an exercise apparatus that is suitable for outdoor use, that enables authorised users to access and use portable items of exercise equipment, and that monitors replacement of the exercise equipment after use to ensure that it is available afterwards for other authorised users.

SUMMARY OF INVENTION

According to one aspect of the present invention there is provided an exercise apparatus comprising a support element for physically supporting a user and a container having a storage volume, and one or more items of exercise equipment configured to be stored in the storage volume,

- wherein the container includes an access opening providing access to the storage volume;
- a closure element associated with the access opening, wherein the closure element is movable between a closed position in which it closes the access opening and an open position in which it does not close the access opening;
- a releasable lock associated with the closure element, wherein the releasable lock has a locked state in which it locks the closure element in the closed position and an unlocked state in which it does not lock the closure element in the closed position;
- and a control device that is configured to communicate with a personal mobile device associated with a user and exchange control signals therewith, said control signals including an authorisation signal that authorises use of the exercise apparatus;
- wherein the control device is operably connected to the releasable lock and is configured to set the lock in the unlocked state upon receiving an authorisation signal and in the locked state when no authorisation signal is received,
- and a weight sensor that senses a weight value associated with the items of exercise equipment stored in the storage volume,
- wherein the control device is configured to receive a weight signal from the weight sensor and detect from said weight signal the removal of said items of exercise equipment from the storage volume and the replacement of said items of exercise equipment in the storage volume.

The control device can be actuated by an authorised user using their personal mobile device and operated to set the lock in the unlocked state, allowing the authorised user to access the exercise equipment contained within the storage volume. The user can then exercise using the exercise equipment. The support element for physically supporting a user while exercising may for example be a bench or seat.

The weight sensor senses a weight value associated with the items of exercise equipment stored in the storage volume, which enables the control device to monitor the removal of exercise equipment from the storage volume and the replacement of the exercise equipment in the storage volume, ensuring that the equipment is available for use later by another authorised user. After the user has completed their exercise and has returned the exercise equipment to the storage volume the closure element may be closed and locked in the closed position to safeguard the equipment until it is next required.

The term "personal mobile device associated with a user" as used herein includes personal communications devices such as mobile phones or a smart watches, plus other devices that can be associated with a user, such as an identification card, a fob or another personal device that uniquely identifies the user and can be used to actuate the exercise apparatus.

The exercise apparatus enables outdoor exercise in public outdoor locations by authorised users and prevents damage to or theft of the exercise equipment by people who are not authorised to use it.

In one embodiment, the invention relates to an exercise apparatus for outdoor use, in the form of an outdoor exercise bench or seat, that stores items of exercise equipment, for example gym or fitness equipment, and with which a user can interact by means of a personal mobile device, for example a mobile phone, watch or other mobile device.

By interacting with the exercise apparatus through a personal mobile device the user can gain access to the exercise equipment stored in the apparatus, pay for and monitor use of the equipment, and receive information relating for example to correct use of the equipment, training programs and so on.

The exercise apparatus may be configured to securely retain one or more items of exercise equipment and provide a user with access to the exercise equipment through connectivity with the user's personal mobile device. The exercise apparatus may optionally aid the user in performing various fitness activities using the items of exercise equipment.

Optionally, the exercise apparatus may be able to detect the presence or absence of exercise equipment that is intended to be stored in the storage volume and communicate with a service provider who is responsible for providing, servicing and maintaining the exercise apparatus and the exercise equipment, for example to monitor use thereof and to collect payments for use of the exercise equipment.

In an embodiment, the exercise apparatus comprises a weight sensor that senses a weight value associated with items of exercise equipment stored in the storage volume and the control device is configured to receive a weight signal from the weight sensor. Optionally, the control device is configured to determine from the weight signal whether, after one or more items of exercise equipment have been removed from the storage volume, said items of exercise equipment have been replaced in the storage volume.

Optionally, the control device is configured to enter an alarm mode if it determines, after items of exercise equipment have been removed from the storage volume, that said items of exercise equipment have not been replaced in the storage volume within a predetermined time.

Optionally, the control device is configured to sense use of the exercise apparatus by a user, and adjust the predetermined time before entering the alarm mode if it detects use of the exercise apparatus by a user.

Optionally, the control device is configured, upon entering the alarm mode to perform one or more of the following actions:

a. communicate with the personal mobile device associated with the user,
b. either set the releasable lock in the locked state or prevent the releasable lock being set in the unlocked state,
c. generate an alarm signal.

Optionally, the container comprises a positioning element within the storage volume, which is configured to receive the one or more items of exercise equipment in specific locations within the storage volume.

Optionally, the exercise apparatus comprises a plurality of weight sensors configured to sense a weight value and a weight distribution associated with the items of exercise equipment in the storage volume.

Optionally, the control device is configured to communicate wirelessly with the personal mobile device.

Optionally, the control device is configured to communicate with the personal mobile device via a telecommunications network.

Optionally, the control signals exchanged between the control device and the personal mobile device include data relating to one or more of: the location of the exercise apparatus, the availability of the exercise apparatus, and the contents of the container.

Optionally, the control signals exchanged between the control device and the personal mobile device include an identification signal that includes identification data associated with the personal mobile device.

Optionally, the control device is configured to communicate with a service provider and exchange service data therewith.

Optionally, the control device is configured to exchange service data that includes data relating to one or more of: the location of the exercise apparatus, the availability of the exercise apparatus, the contents of the container, usage of the exercise apparatus, user identification, billing information, time and/or date information, or alarm mode information.

Optionally, the control device is configured to communicate wirelessly with the service provider.

Optionally, the exercise apparatus includes a power supply unit, which may be self-contained, for example including a battery and a solar charging device.

Optionally, the exercise apparatus comprises one or more sensors configured to communicate with one or more identification devices associated with the items of exercise equipment.

Optionally, the exercise apparatus includes a tamper detection system that is configured to sense unauthorised use, misuse or tampering with the exercise apparatus.

Optionally, the tamper detection system is configured to exchange tamper detection signals with the control device.

Optionally, the control device is configured to enter the alarm mode when the tamper detection system senses unauthorised use, misuse or tampering with the exercise apparatus.

Optionally, the support element comprises a bench top or seat base and/or seat back.

Optionally, the support element comprises or is attached to the closure element.

Optionally, the closure element is pivotably attached to the container for movement between the open position and the closed position.

According to another aspect of the invention there is provided an exercise system including service provider and one or more items of exercise apparatus according to any one of the preceding statements of invention, wherein the one or more items of exercise apparatus are configured to communicate with the service provider and exchange service data therewith.

Optionally, the one or more items of exercise apparatus are configured to exchange service data that includes data relating to one or more of: the location of the exercise apparatus, the availability of the exercise apparatus, the contents of the container, usage of the exercise apparatus, user identification, billing information, time and/or date information, or alarm information.

Optionally, the one or more items of exercise apparatus are configured to communicate wirelessly with the service provider.

According to another aspect of the invention there is provide an exercise apparatus that comprises a support element for physically supporting a user, a container having a storage volume, and one or more items of exercise equipment configured to be stored in the storage volume. The container includes an access opening providing access to the storage volume, a closure element and a releasable lock for locking the closure element in the closed position. A control device is configured to communicate with a personal mobile device associated with a user and exchange control signals including an authorisation signal that authorises use of the exercise apparatus. The control device is configured to receive a weight signal from a weight sensor associated with the storage volume and detect from said weight signal the removal and replacement of items of exercise equipment in the storage volume.

BRIEF DESCRIPTION OF DRAWINGS

Embodiments of the invention will now be described, by way of example, with reference to accompanying drawings, in which.

DETAILED DESCRIPTION

Figure 1A:
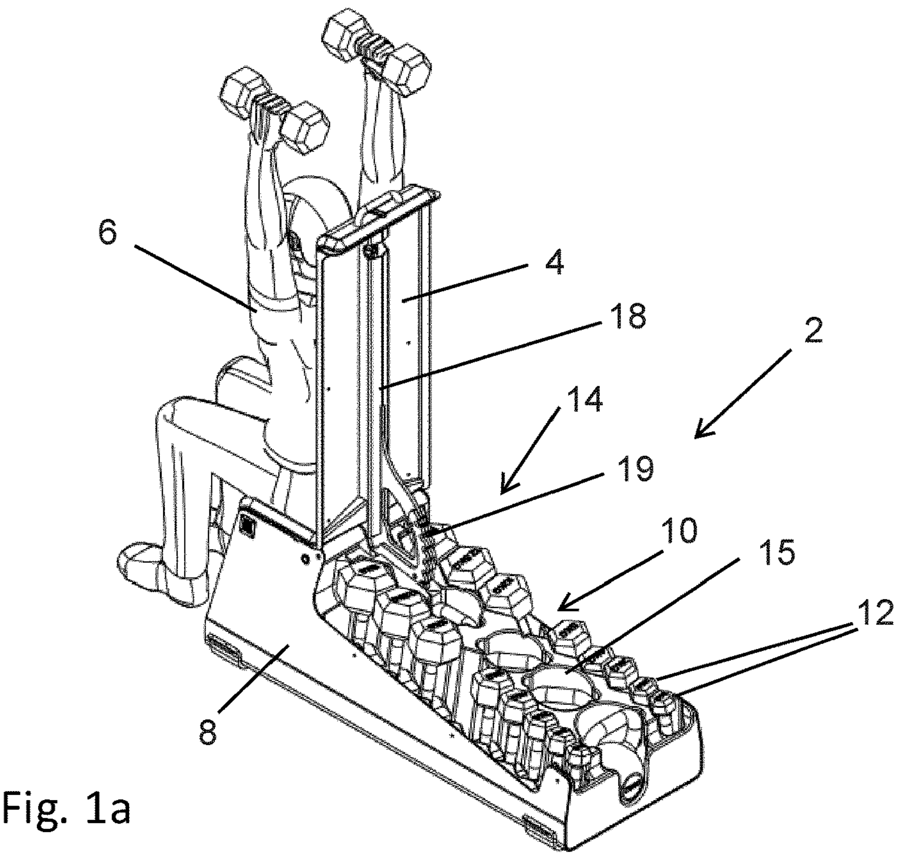
FIGS. 1*a* and 1*b* are isometric views of an exercise apparatus in an open configuration.

The embodiments herein relate to an exercise apparatus. The following description presents exemplary embodiments and, together with the drawings, serves to explain principles of the invention. The scope of the invention, however, is not intended to be limited to the precise details of the embodiments, since variations will be apparent to a skilled person and are deemed also to be covered by the claims. For example, the embodiments described herein relate to an exercise apparatus that is not limited to an exercise bench, which is only an exemplary embodiment described by way of example only and with reference to the accompanying drawings. Thus, the invention relates to an exercise apparatus as defined by the appended claims.

Descriptive terms should be given the broadest possible interpretation: e.g. the term "comprising" as used in this specification means "consisting at least in part of" such that in interpreting each statement in this specification that includes the term "comprising", features other than that or those prefaced by the term may also be present. Related terms such as "comprise" and "comprises" are to be interpreted in the same manner. Directional terms such as "vertical", "horizontal", "up", "down", "top", "bottom", "upper" and "lower" are used for convenience of explanation usually with reference to the illustrations and are not intended to be limiting if an equivalent function can be achieved with an alternative dimension and/or direction.

The exercise apparatus 2 shown in the accompanying drawings comprises in this embodiment an exercise bench or seat having a support element 4 for physically supporting a user 6 and a container 8 having a storage volume 10 for storing one or more items of exercise equipment 12, for example portable items of exercise equipment such as weights or kettle bells, or various other kinds of gym or fitness equipment.

The container 8 includes an access opening 14 providing access to the storage volume 10. The storage volume 10 may include a positioning element 15 providing compartments that are shaped to receive different items of exercise equipment. Additional compartments may be provided to accommodate additional equipment or personal items, for example a user's bag. Optionally, the storage volume 10 may also include lockable compartments for example to enable access to exercise equipment stored within each compartment.

The exercise apparatus 2 may for example comprise a bench or seat, wherein the support element 4 comprises for example a bench top or a seat base and back. In this embodiment the support element 4 comprises a fixed support element 4*a* and a movable support element 4*b* that comprises a closure element 16. The closure element 16 may be pivotably attached to the container 8 for movement between an open position shown in FIGS. 1*a* and 1*b* and a closed position shown in FIG. 2 and FIGS. 3*a* and 3*b*. The exercise apparatus 2 may further comprise the one or more items of exercise equipment 12. The one or more items of exercise equipment 12 may optionally include identification devices, for example RFID tags (17).

The closure element 16 is movable between a closed position (FIGS. 2, 3*a*, 3*b*) in which it closes the access opening 14 and an open position (FIGS. 1*a* and 1*b*) in which it does not close the access opening 14. The closure element 16 can pivot about an axis X from the closed position to the open position. The closure element 16 may be moved from the closed position to the open position by a user lifting the closure element 16. Typically, the closure element 16 may be pivoted through an angle $\alpha$ from the closed position to the open position, where the angle $\alpha$ is in the range 70-110°, typically about 80-100°. Optionally, it may also be possible to lock the closure element 16 in an intermediate position between the closed position and the open position.

Figure 2:
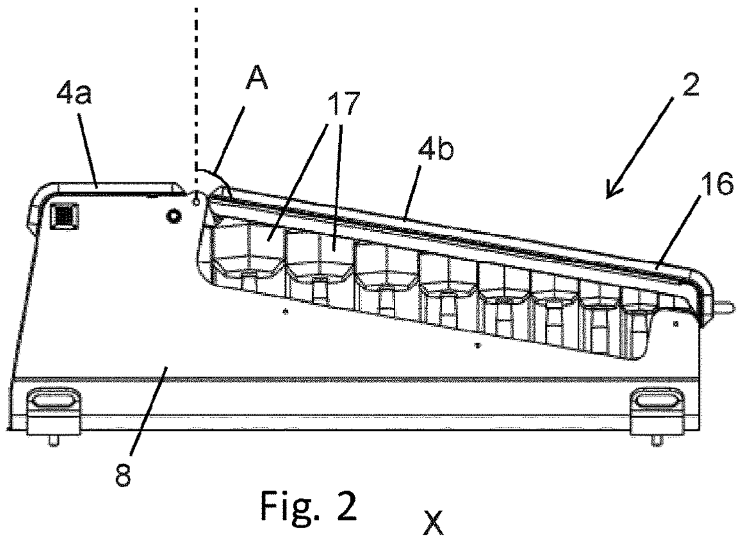
FIG. 2 is a side view of the exercise apparatus in a closed configuration.
Figure 3A:
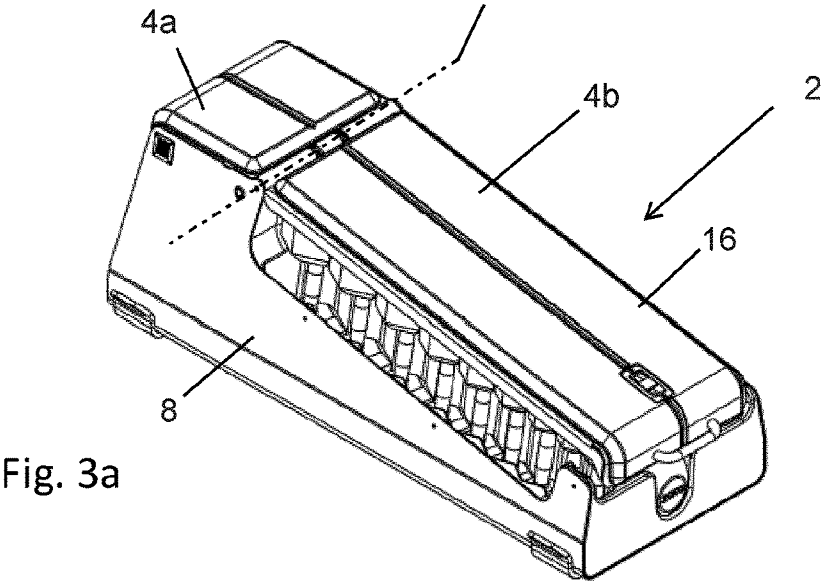
FIGS. 3*a* and 3*b* are isometric views of the exercise apparatus in a closed configuration.
Figure 3B:
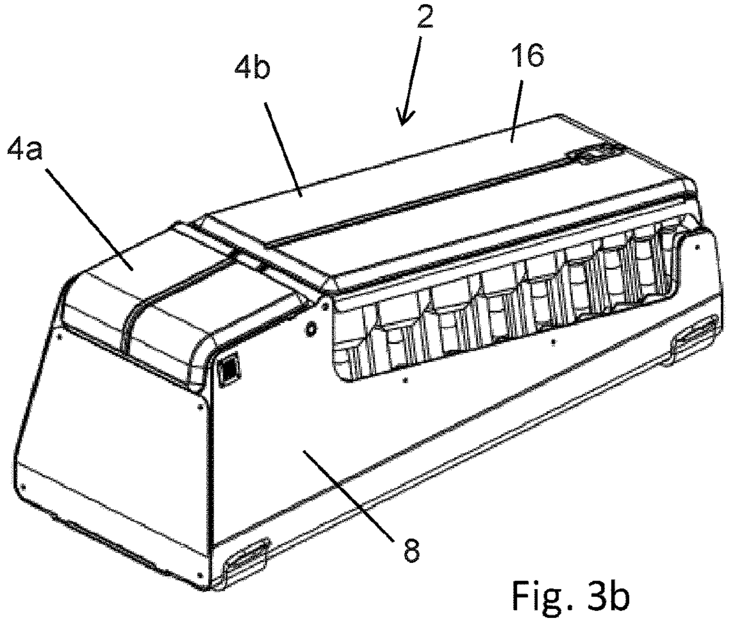

In the closed position of the closure element 16 illustrated in FIGS. 2, 3*a* & 3*b* the support element 4, 4*a*, 4*b* may provide a relatively flat or inclined support in the form of a bench top, allowing a user to perform exercises while lying on the exercise apparatus 2. This may be suitable for exercises such as flat bench presses or lying triceps extensions.

Figure 1B:
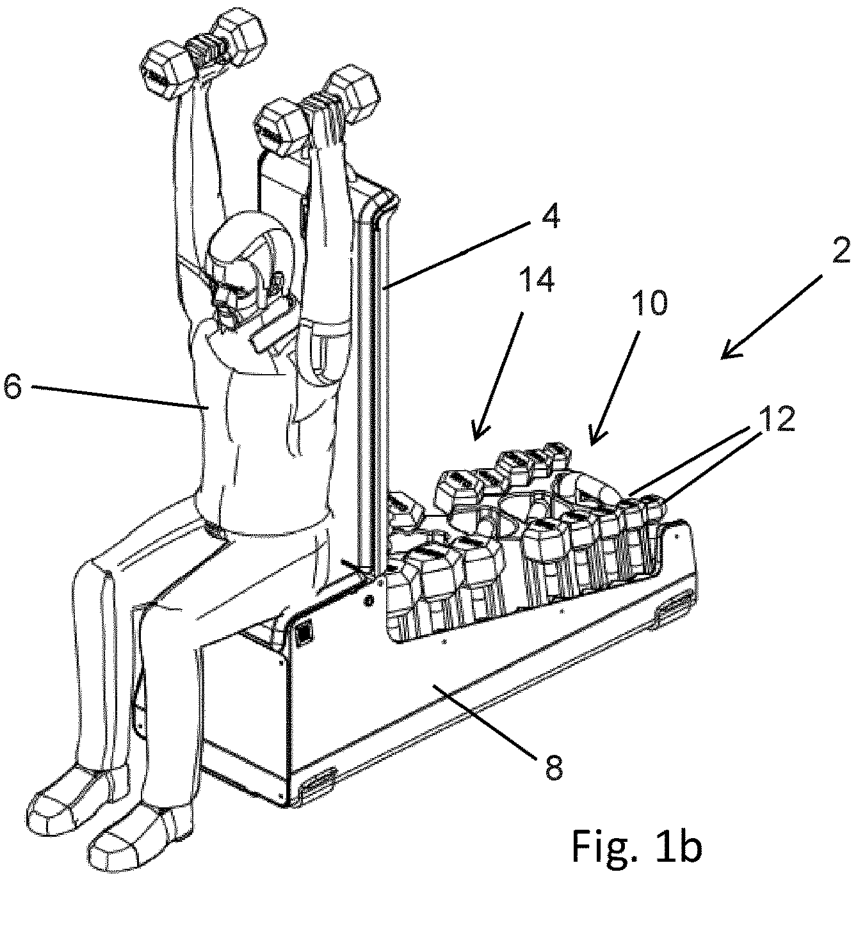

In the open position of the closure element 16 illustrated in FIGS. 1*a* & 1*b*, the movable support element 4*b* may provide an upright support or seat back for a user 6, while the fixed support element 4*a* provides a seat base, allowing a user 6 to perform exercises while seated in a relatively upright position.

The position of the movable closure element 16 may be adjusted allowing a user to perform specific exercises at various inclines relative to the closed position. The closure element 16 may be adjusted to an intermediate position between the open and closed positions such that the closure element 16 is inclined relative to the closed position. The closure element 16 may be secured by a releasable locking mechanism 19, for example a ratchet mechanism, at one or more intermediate positions so that the user can perform exercises while being supported by the closure element at one or more inclined angles.

The exercise apparatus 2 may include a releasable lock 18 that is configured to lock the closure element 16 in the closed position. The releasable lock 18 has a locked state in which it locks the closure element 16 in the closed position and an unlocked state in which it does not lock the closure element 16 in the closed position.

Optionally, the releasable lock 18 may also be used to lock the closure element 16 in an intermediate position between the closed position and the open position. The releasable lock 18 may have a locked state in which it locks the closure element 16 in an intermediate position and an unlocked state in which it does not lock the closure element in an intermediate position. Alternatively, a separate locking mechanism 19, for example a ratchet mechanism. may be provided for locking the closure element 16 in an intermediate position.

Figure 4:
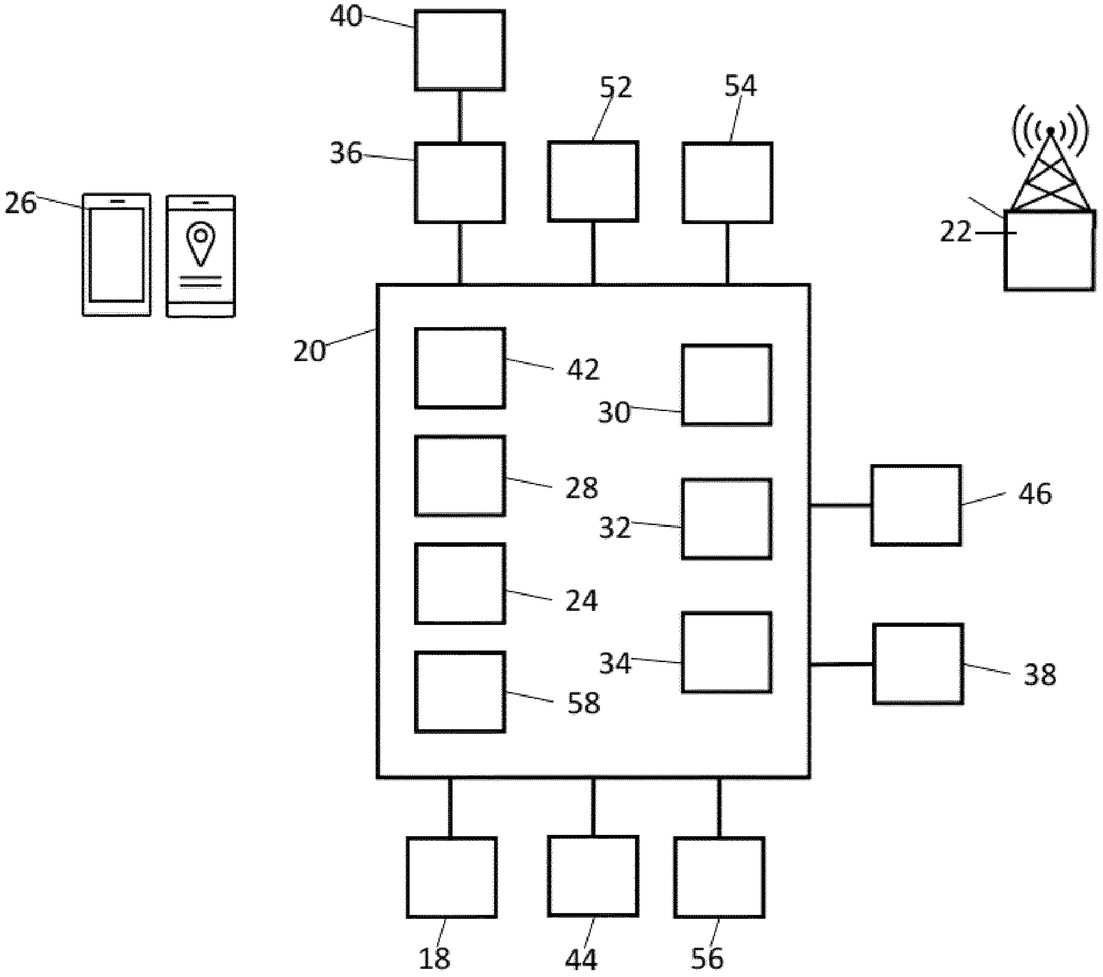
FIG. 4 is a system diagram illustrating components of a control system of the exercise apparatus.

The exercise apparatus 2 may include a control system, illustrated schematically in FIG. 4, comprising a control device 20 for controlling operation of the exercise apparatus, and optionally for communicating with a remote service provider 22. The control device 20 may be integrated with the exercise apparatus 2, for example it may be housed within the storage container 10.

The control device 20 may include a communicator 24 that is configured to communicate and exchange control signals with a user's personal mobile device 26, which may for example be a mobile phone, a smart watch, an identification card, a fob or another personal mobile device. The control signals exchanged between control device 20 and the remote service provider 22 may for example include an authorisation signal that authorises use of the exercise apparatus 2.

The communicator 24 may be configured to communicate wirelessly with a user's personal mobile device 26. The control device 20 may be configured to communicate with the personal mobile device 26 via a telecommunications network, for example a mobile phone network. Alternatively, the communicator 24 may be configured to communicate with a user's personal mobile device 26 by other wireless communication methods, for example radio-frequency identification (RFID) for example near-field communication (NFC), or satellite communication for example for a global positioning system (GPS), or Wi-Fi or short-range wireless communication such as Bluetooth, or by optical or infrared signals, etc.

The communicator 24 may optionally be configured to communicate with a plurality of personal mobile devices that are associated with people other than the current user 6. For example, the control device 20 may be configured to communicate with other potential users for example to notify them that the exercise apparatus 2 is currently in use or has become available or will become available for example at a predicted time.

The control signals exchanged between the communicator 24 and the personal mobile device 26 may include data relating to one or more of: the location of the exercise apparatus, the availability of the exercise apparatus, and the contents of the container.

The control signals exchanged between the communicator 24 and the personal mobile device 26 may include an identification signal that includes identification data associated with the personal mobile device 26. The control device 20 may include a memory 28 that stores data relating to usage: for example the date and time of use, location of use, duration of use, the exercise equipment accessed by the user, the frequency of usage by a user and other information.

The control device 20 may be operably connected to the releasable lock 18 and configured to set the lock in the unlocked state upon receiving an authorisation signal, and to set the lock in the locked state when no authorisation signal is received. The control device 20 may optionally be configured to set the lock 18 in the locked state when a signal to lock the releasable lock 18 is received by the control device 20.

The control device 20 may be configured to communicate wirelessly with a service provider 22, either via the first communicator 24 or a second communicator 30. The control device 20 may be configured to communicate with a service provider 22 and exchange service data therewith. The control device 20 may be configured to receive communications data from the service provider 22 and transmit data to the user's personal mobile device 26. A user may transmit a signal from their personal mobile device 26 to the control device 20 either directly through the first communicator 24 or indirectly through the service provider 22 by transmitting a signal to the service provider 22 and the service provider 22 then transmitting a signal to the control device 20.

The control system 20 of the exercise apparatus 2 may optionally include a display 32 that is configured to display information to a user. The display may optionally include an input device 34, for example a touchscreen, enabling the user to input data, for example a pin-code received by the user from the service provider 22 to authorise access to and use of the exercise apparatus 2. This may provide a failsafe option for a user to access the exercise apparatus 2 for example in the event that the wireless communication between the control device 20 and the user's personal mobile device 26 fails to operate correctly.

The input device 34 may include one or more buttons or alternative input devices to enable the user to navigate the display and/or transmit data to the control device 20.

The display 32 may provide a status update for example indicating that scheduled maintenance is planned to take place or to indicate that a user has pre-booked access to the exercise apparatus 2 at a particular time. The display may be used to display additional information, for example promotional offers, or instructions on using the exercise apparatus for a particular exercise, or the date and/or time. The display 32 may be configured to be synchronised with the user's personal mobile device 26 to display a user interface for the user's personal mobile device.

The exercise apparatus 2 may include a tamper detection system 36 that is configured to sense unauthorised use, misuse or tampering with the exercise apparatus. The tamper detection system 36 may be configured to exchange tamper detection signals with the control device 20. The tamper detection system 36 may be configured to activate an alarm device 38 when it senses unauthorised use, misuse or tampering with the exercise apparatus. For example, the exercise apparatus 2 may activate the alarm if unauthorised access is detected: for example if the closure element 16 is lifted or an attempt is made to lift the closure element 16 while the releasable lock 18 is in the locked state.

The tamper detection system 36 may include a sensor 40 configured to detect lifting of the closure element 16 or tampering with the exercise apparatus 2. The sensor 40 may be housed within the storage container 10 and/or located at an edge of the access opening 14 or on the closure element 16. The sensor 40 may include for example an impact or motion detection sensor.

The control device 20 may include a timer 42. The control device 20 may be configured to automatically set the lock 18 in the locked state after a predetermined time period has elapsed. The elapsed time may be calculated for example from the time when the lock was set in the unlocked state. The alarm 38 may be activated after a predetermined time period to notify the user that their access to the exercise apparatus has expired or is due to expire. The control device 20 may activate the alarm 38 if the user's personal device is not within the vicinity of the exercise apparatus 2 and/or if the lock 18 is in the unlocked state, thereby prompting the user to lock the exercise apparatus 2.

The control device 20 may be configured to exchange service data with the service provider 22, including for example data relating to one or more of: the location of the exercise apparatus, the availability of the exercise apparatus, the contents of the container, usage of the exercise apparatus, user identification, billing information, time and/or date information, or alarm information. The service data may be exchanged between the exercise apparatus 2 and the service provider 22. The service data may be exchanged between the exercise apparatus 2 and a user's personal mobile device 26, for example if the user is a service engineer.

The exercise apparatus 2 may include a power supply unit 44, for example including a battery, a photovoltaic cell and/or a connection to a mains electricity supply. The power supply unit 44 may include a rechargeable battery.

The exercise apparatus may comprise a weight sensor 46 that senses a weight value associated with the items of exercise equipment 12 stored in the storage volume 10. In this case the control device 20 may be configured to receive a weight signal from the weight sensor 46 and detect from said weight signal the removal of items of exercise equipment from the storage volume 10 and the replacement of said items of exercise equipment in the storage volume.

The weight sensor 46 may be configured in a number of alternative arrangements. For example, the weight sensor 46 may be configured to sense the gross weight of the entire exercise equipment 2 including any exercise equipment 12 stored in the storage volume 10, and to sense changes in the gross weight as items of exercise equipment are removed from and returned to the storage volume 10. This may be achieved using a single weight sensor that senses the total gross weight of the exercise apparatus 2 or a plurality of weight sensor located in different positions within support structures that support the exercise apparatus 2 on the ground.

If a plurality of weight sensors is provided these may be used to monitor the overall weight of the exercise apparatus and/or the distribution of weight within the storage volume 10. By monitoring the weight, the control device 20 can assess whether items of exercise equipment have been removed from or returned to the storage volume. The control device 20 can also sense when a foreign object not having a weight equal to that of the exercise equipment has been placed in the storage volume in an attempt to mislead the control device.

Optionally, the storage volume 10 may contain a positioning element 15 within the storage volume 10, which provides a plurality of compartments for receiving individual items of exercise equipment 12. Each of those compartments may be provided with a weight sensor 46 to sense the weight of an object in the compartment, allowing the control device 20 to assess whether the individual items of exercise equipment 12 have been removed from or returned to the storage volume 10.

In an embodiment, the exercise apparatus 2 comprises a weight sensor 46 that senses a weight value associated with the items of exercise equipment stored in the storage volume 10, and a control device 20 that is configured to receive a weight signal from the weight sensor 46. Optionally, the control device 20 is configured to determine from the weight signal whether, after one or more items of exercise equipment 12 have been removed from the storage volume 10, the items of exercise equipment have been replaced in the storage volume.

The control device 20 may be configured to enter an alarm mode if it determines, after items of exercise equipment 12 have been removed from the storage volume 10, that said items of exercise equipment have not been replaced in the storage volume within a predetermined time period, for example 10 minutes, 20 minutes, 30 minutes or any other time as may be decided by the service provider.

The control device 20 may be configured to sense use of the exercise apparatus by a user, and to adjust the predetermined time before entering the alarm mode if it detects use of the exercise apparatus by a user.

The control device 20 may be configured, upon entering the alarm mode, to perform one or more of the following actions:

a. communicate with the personal mobile device 26 associated with the user, or
b. set the releasable lock 18 in the locked state or prevent the releasable lock being set in the unlocked state, or
c. generate an alarm signal via an alarm device 38.

The container 8 may comprise a positioning element 15 within the storage volume 10, which is configured to receive the one or more items of exercise equipment 12 in specific locations or compartments within in the storage volume.

The exercise apparatus may comprise a plurality of weight sensors that sense a weight value and a weight distribution associated with the items of exercise equipment 12 stored in the storage volume 10.

The exercise apparatus 2 may include a speaker or sounder device 52 for example for playing music or enabling a user to listen to instructions, information or public broadcasts, for example radio programs. The user may be able to sync their personal mobile device 26 to the exercise apparatus 2 in order to play music from their personal mobile device through the speaker 52. The exercise apparatus 2 may include one or more connection ports 54 to enable wired connection between the exercise apparatus 2 and the user's personal mobile device 26. This may be useful where a user's personal mobile device 26 lacks sufficient battery power to communicate with the exercise apparatus. The user may also be able to charge their personal mobile device 26 via the connection port 54.

The control device 20 may include a sensor 56 that is configured to sense the removal of items of exercise equipment 12 from the container and/or the replacement of those items. The control device 20 may be configured to communicate with a plurality of sensors 56 located within the storage container 10 including for example the alarm sensor and/or the weight sensor. Further weight sensors may be provided on one or more surfaces of the exercise apparatus 2 for example the support element 4. The control device 20 may determine the duration use of the exercise apparatus 2 and/or the locations of the other exercises apparatuses that the user has interacted with during or prior to their use of the apparatus 2.

The sensor 56 may for example be an RFID device for example an NFC device or a weight sensor. The sensor may be configured to communicate with one or more identification devices associated with the items of exercise equipment, for example RFID tags. The sensor may detect removal and/or replacement of items of exercise via the associated identification devices of the items of exercise equipment.

The control device 20 may include a position sensing device 58, for example a global positioning system (GPS) sensor, which allows it to sense the geographical location of the exercise apparatus 2. This location information may be shared with a user, for example via their mobile personal device 26, enabling the user to locate the exercise apparatus 2.

The control device 20 may include an input and output (10) interface for exchanging signals between one or more of: plurality of sensors 46, 56, memory 28, power supply unit 44, releasable lock 18, tamper detection system 36, alarm 38, personal mobile device 26, display 32, and service provider 22.

The exchange of signals between the one or more of: plurality of sensors, power supply unit, releasable lock, tamper detection system, personal mobile device, display, and service provider may be performed wireless, for example via a telecommunications network including for example radio-frequency identification (RFID) for example near-field communication (NFC), satellite communication for example for a global positioning system (GPS), Wi-Fi, or short-range wireless communication such as Bluetooth. This can provide a variety of possible options for exchanging signals and/or for communication between the components of the exercise apparatus 2, the service provider 22 and the personal mobile device 26. The exchange of signals between one or more of the plurality of sensors, power supply unit, releasable lock, tamper detection system, personal mobile device, display, and service provider may form a telemetry network. The telemetry network may actuate and/or notify one or more of a plurality of sensors, power supply unit, releasable lock, tamper detection system, personal mobile device, display, and service provider.

For example, if the exercise apparatus 2 is moved outside a designated location or is tampered with without authorisation, then the service provider 22 can be notified by the exercise apparatus 2 and/or the alarm 38 can be activated to produce an audible sound which may act as a deterrent to an unauthorised user. For example, in order to gain authorised access to the exercise apparatus 2 a user may transmit a signal directly from their personal mobile device to the control device 20 or indirectly by transmitting a signal to the service provider 22 prompting the service provider to transmit a signal to the control device 20. In order to gain access to the exercise apparatus 2 and/or the storage container 10, the exercise apparatus 2 and/or the control device 20 may be connected to a secure network through which a user can remotely lock or unlock the exercise apparatus using their personal mobile device.

The wireless connectivity may be available via one or more of: a telecommunications network, radio-frequency identification (RFID) for example near-field communication (NFC), satellite communication for example for a global positioning system (GPS), Wi-Fi, or short-range wireless communication such as Bluetooth. This ensures that both local and roaming network connections are available. In the event that connectivity is lost via one or more of the modes of connections then an alternative mode of connection can be selected either automatically or manually. For example, if a roaming network connection via a telecommunications network is lost, then the user may be able to exchange signals with the exercise apparatus via another network or mode of communication for example via RFID.

According to another aspect of the invention there is provided an exercise system including service provider 22 and one or more items of exercise apparatus 2 as described above, wherein the items of exercise apparatus 2 are configured to communicate with the service provider 22 and exchange service data therewith. The service provider 22 may include a fleet management system for managing the one or more items of exercise apparatus 2. The fleet management system may be configured to exchange data between the service provider 22 and the one or more items of exercise apparatus 2.

The one or more items of exercise apparatus 2 may be configured to exchange service data that includes data relating to one or more of: the location of the exercise apparatus, the availability of the exercise apparatus, the contents of the container, usage of the exercise apparatus, user identification, billing information, time and/or date information, or alarm information. The service data may be exchanged between the exercise apparatus 2 and the service centre 22. The service data may be exchanged between the exercise apparatus 2 and a user's personal mobile device 26, for example if the user is a service engineer.

The one or more items of exercise apparatus 2 and/or the service provider 22 may exchange data with a user via their personal mobile device 26, for example to enable the user to identify the location of one or more items of exercise apparatus 2. For example, a user may be interested to learn the location of the nearest exercise apparatus 2 relative to their location.

The one or more items of exercise apparatus 2 and/or the service provider 22 may exchange data with a user via their personal mobile device to provide information including one or more of: the location of the exercise apparatus, the availability of the exercise apparatus, the contents of the container, usage of the exercise apparatus, billing information, or time and/or date information. The user may be able to select from the list of nearby and/or available exercise apparatus 2 or schedule a booking for authorised access to the exercise apparatus 2. A user may select a particular exercise apparatus 2 based on the availability of exercise equipment stored within the storage container 10 of the exercise apparatus 2.

The one or more items of exercise apparatus 2 may be configured to communicate wirelessly with the service provider 22, for example via a telecommunications network. The service provider 22 may communicate with one or more users via a mobile phone app. The mobile phone app may include for example a booking system.

The service provider 22 may receive periodic status updates automatically from each of the one or more items of exercise apparatus. The service provider 22 may send a signal to the one or more items of exercise apparatus to prompt or request a status update. The exercise apparatus 2 may be configured to transmit a status update to the service provider 22 automatically in response to the request from the service provider 22 for a status update.

The invention claimed is:

1. An exercise apparatus comprising:

a support element for physically supporting a user and a container having a storage volume, and one or more items of exercise equipment configured to be stored in the storage volume, wherein the container includes an access opening providing access to the storage volume;

a closure element associated with the access opening, wherein the closure element is movable between a closed position in which it closes the access opening and an open position in which it does not close the access opening;

a releasable lock associated with the closure element, wherein the releasable lock has a locked state in which it locks the closure element in the closed position and an unlocked state in which it does not lock the closure element in the closed position;

and a control device that is configured to communicate with a personal mobile device associated with a user and exchange control signals therewith, said control signals including an authorisation signal that authorises use of the exercise apparatus;

wherein the control device is operably connected to the releasable lock and is configured to set the lock in the unlocked state upon receiving an authorisation signal and in the locked state when no authorisation signal is received, and a weight sensor that senses a weight value associated with the items of exercise equipment stored in the storage volume, wherein the control device is configured to receive a weight signal from the weight sensor and detect from said weight signal the removal of said items of exercise equipment from the storage volume and the replacement of said items of exercise equipment in the storage volume; and a bench or seat.

2. The exercise apparatus according to claim 1, wherein the control device is configured to determine from the weight signal whether, after said items of exercise equipment have been removed from the storage volume, said items of exercise equipment have been replaced in the storage volume.

3. The exercise apparatus according to claim 2, wherein the control device is configured to enter an alarm mode if it determines, after said items of exercise equipment have been removed from the storage volume, that said items of exercise equipment have not been replaced in the storage volume within a predetermined time.

4. The exercise apparatus according to claim 3, wherein the control device is configured to sense use of the exercise apparatus by a user, and to adjust the predetermined time before entering the alarm mode if it detects use of the exercise apparatus by a user.

5. The exercise apparatus according to claim 3, wherein the control device is configured, upon entering the alarm mode to perform one or more of the following actions:

a. communicate with the personal mobile device associated with the user, or b. set the releasable lock in the locked state or prevent the releasable lock being set in the unlocked state, or c. generate an alarm signal.

6. The exercise apparatus according to claim 1, wherein the container comprises a positioning element within the storage volume, which is configured to receive the one or more items of exercise equipment in specific locations within in the storage volume.

7. The exercise apparatus according to claim 1, comprising a plurality of weight sensors that sense a weight value and a weight distribution associated with the items of exercise equipment stored in the storage volume.

8. The exercise apparatus according to claim 1, wherein the control device is configured to communicate wirelessly with the personal mobile device.

9. The exercise apparatus according to claim 8, wherein the control device is configured to communicate with the personal mobile device via a telecommunications network.

10. The exercise apparatus according to claim 1, wherein the control signals exchanged between the control device and the personal mobile device include data relating to one or more of: the location of the exercise apparatus, the availability of the exercise apparatus, and the contents of the container.

11. The exercise apparatus according to claim 1, wherein the control signals exchanged between the control device and the personal mobile device include an identification signal that includes identification data associated with the personal mobile device.

12. The exercise apparatus according to claim 1, wherein the control device is configured to communicate with a service provider and exchange service data therewith.

13. The exercise apparatus according to claim 12, wherein the control device is configured to exchange service data that includes data relating to one or more of: the location of the exercise apparatus, the availability of the exercise apparatus, the contents of the container, usage of the exercise apparatus, user identification, billing information, time and/or date information, or alarm mode information.

14. The exercise apparatus according to claim 12, wherein the control device is configured to communicate wirelessly with the service provider.

15. The exercise apparatus according to claim 1, including a power supply unit.

16. The exercise apparatus according to claim 1, comprising one or more sensors configured to communicate with one or more identification devices associated with the items of exercise equipment.

17. The exercise apparatus according to claim 1, including a tamper detection system that is configured to sense unauthorised use, misuse or tampering with the exercise apparatus.

18. The exercise apparatus according to claim 17, wherein the tamper detection system is configured to exchange tamper detection signals with the control device.

19. The exercise apparatus according to claim 17, wherein the control device is configured to enter the alarm mode when the tamper detection system senses unauthorised use, misuse or tampering with the exercise apparatus.

20. The exercise apparatus according to claim 1, wherein the support element comprises a bench top or seat base and seat back.

21. The exercise apparatus according to claim 1, wherein the support element comprises or is attached to the closure element.

22. The exercise apparatus according to claim 1, wherein the closure element is pivotably attached to the container for movement between the open position and the closed position.

23. The exercise system according to claim 1, including a service provider, wherein the one or more items of exercise apparatus are configured to communicate with the service provider and exchange service data therewith.

24. The exercise apparatus according to claim 23, wherein the one or more items of exercise apparatus are configured to exchange service data that includes data relating to one or more of: the location of the exercise apparatus, the availability of the exercise apparatus, the contents of the container, usage of the exercise apparatus, user identification, billing information, time and/or date information, or alarm information.

25. The exercise apparatus according to claim 23, wherein the one or more items of exercise apparatus are configured to communicate wirelessly with the service provider.

* * * * *